(12) United States Patent
Dulger

(10) Patent No.: US 7,115,007 B2
(45) Date of Patent: Oct. 3, 2006

(54) STERN UNIT FOR MARINE CRAFT

(75) Inventor: Fikret Dulger, Anatalya (TR)

(73) Assignee: EMEA Investment Management, LLC, San Francisco, CA (US)

( * ) Notice: Subject to any disclaimer, the term of this patent is extended or adjusted under 35 U.S.C. 154(b) by 0 days.

(21) Appl. No.: 10/416,076

(22) PCT Filed: Nov. 8, 2001

(86) PCT No.: PCT/TR01/00057

§ 371 (c)(1),
(2), (4) Date: May 6, 2003

(87) PCT Pub. No.: WO02/38441

PCT Pub. Date: May 16, 2002

(65) Prior Publication Data
US 2004/0025775 A1 Feb. 12, 2004

(30) Foreign Application Priority Data
Nov. 8, 2000 (TR) .............................. a 2000 03297

(51) Int. Cl.
B63H 1/12 (2006.01)
B63H 5/14 (2006.01)
(52) U.S. Cl. ........................................ 440/66; 440/111
(58) Field of Classification Search .................. 440/38, 440/47, 66–70, 111, 112, 49; 114/67 A, 114/288, 162–169
See application file for complete search history.

(56) References Cited

U.S. PATENT DOCUMENTS

| 2,096,223 | A |   | 10/1937 | Chandler et al. |
| 3,336,752 | A | * | 8/1967 | Smith .......................... 60/221 |
| 3,336,891 | A | * | 8/1967 | Stark ....................... 114/144 R |
| 3,469,558 | A |   | 9/1969 | Puretic |
| 3,742,895 | A | * | 7/1973 | Horiuchi ....................... 440/66 |
| 3,793,980 | A | * | 2/1974 | Sherman ....................... 440/69 |
| 3,942,464 | A | * | 3/1976 | Schoell ......................... 440/41 |
| 4,000,712 | A |   | 1/1977 | Erikson |
| 4,443,202 | A | * | 4/1984 | Arena .......................... 440/51 |
| 4,553,945 | A | * | 11/1985 | Foster .......................... 440/51 |
| 4,748,314 | A | * | 5/1988 | Desage ......................... 440/66 |
| 4,861,294 | A |   | 8/1989 | Ousley, II |
| 4,941,423 | A | * | 7/1990 | Van Tassel .................. 114/289 |
| 5,036,781 | A | * | 8/1991 | Jarvi ............................ 114/40 |
| 5,066,255 | A |   | 11/1991 | Sand |

(Continued)

FOREIGN PATENT DOCUMENTS

DE 10016990 A1 * 10/2001

(Continued)

*Primary Examiner*—Ajay Vasudeva
(74) *Attorney, Agent, or Firm*—Venable, Campillo, Logan & Meaney PC

(57) ABSTRACT

A stern unit of marine craft that comprises a casing, a propeller, a propeller shaft, and at least one rudder actuated by hydraulic pistons is described. The casing is open at the bottom, with its bottom surface having a parabolic shape in cross-section. The casing has an inlet section near to the hull that diverges rearwardly toward an outlet section. The casing provides a housing to the shaft, the propeller, and the rudders, with a gap located above the trace line of the boat bottom where air is sucked above the water surface line such that an air film extends inside the casing along the bottom surface of the casing to an outlet of the casing. The air film reduces frictional resistance between the flowing water and the casing surface to enable additional thrust.

3 Claims, 3 Drawing Sheets

U.S. PATENT DOCUMENTS

| | | | | |
|---|---|---|---|---|
| 5,074,813 A | * | 12/1991 | Jarvi et al. | 440/66 |
| 5,171,175 A | * | 12/1992 | Buzzi | 440/66 |
| 5,439,403 A | * | 8/1995 | Rolla | 440/51 |
| 5,957,078 A | * | 9/1999 | Van Tassel | 114/288 |
| 6,045,420 A | * | 4/2000 | Small et al. | 440/69 |
| 6,193,573 B1 | * | 2/2001 | Small | 440/69 |

FOREIGN PATENT DOCUMENTS

| | | | | |
|---|---|---|---|---|
| GB | 2028746 A | * | 3/1980 | |
| GB | 2344331 A | * | 6/2000 | |
| GB | 2381514 A | * | 5/2003 | |
| JP | 55106892 A | * | 8/1980 | |
| JP | 07279894 A | * | 10/1995 | |
| JP | 08104293 A | * | 4/1996 | |

* cited by examiner

STERN UNIT FOR MARINE CRAFT

BACKGROUND OF THE INVENTION

1. Field of the Invention

The present invention relates to the stern unit provided in marine craft whereby power generated by the engine and the transmission mechanism is linearly transmitted to the propeller by means of a shaft.

2. Discussion of Related Art

Generally, in the stern section of the marine craft, lubrication oil, felt gaskets against oil leakage, balls for the bearing of the shaft, spider balls for directing the power, and fastening elements such as bellows, bolts and clamps that provide the inter connection of these components, gear assemblies and joints are employed.

In U.S. Pat. No. 5,066,255, as a document known from the state of art, a drive arrangement in which a drive shaft extends from an inboard engine through the stern wall to a propeller arranged in a tunnel-shaped water flow guide structure extending backwardly from the bottom edge of the stern wall, is described. This structure is movable upwards and downwards as well as to the left and to the right. However the number of the components providing these movements is quite high and furthermore balls, spider, felt (including felt gaskets), gear wheels and lubrication oil are used, consequently the ratio of break-down and damages increases due to the mechanical wearing of the components.

SUMMARY OF THE INVENTION

The object of the present invention is the realization of the stern unit in marine craft, whereby power generated by the engine and the transmission mechanism is linearly transmitted to the propeller by means of a shaft.

Another object of the present invention is to increase the maneuverability of the marine craft by directing/orienting it without blocking the water stream.

BRIEF DESCRIPTION OF THE DRAWINGS

The stern unit for marine craft, realized in order to attain the object of the present invention, has been illustrated in the attached drawings; wherein.

DETAILED DESCRIPTION OF THE EMBODIMENT

Figure 1:
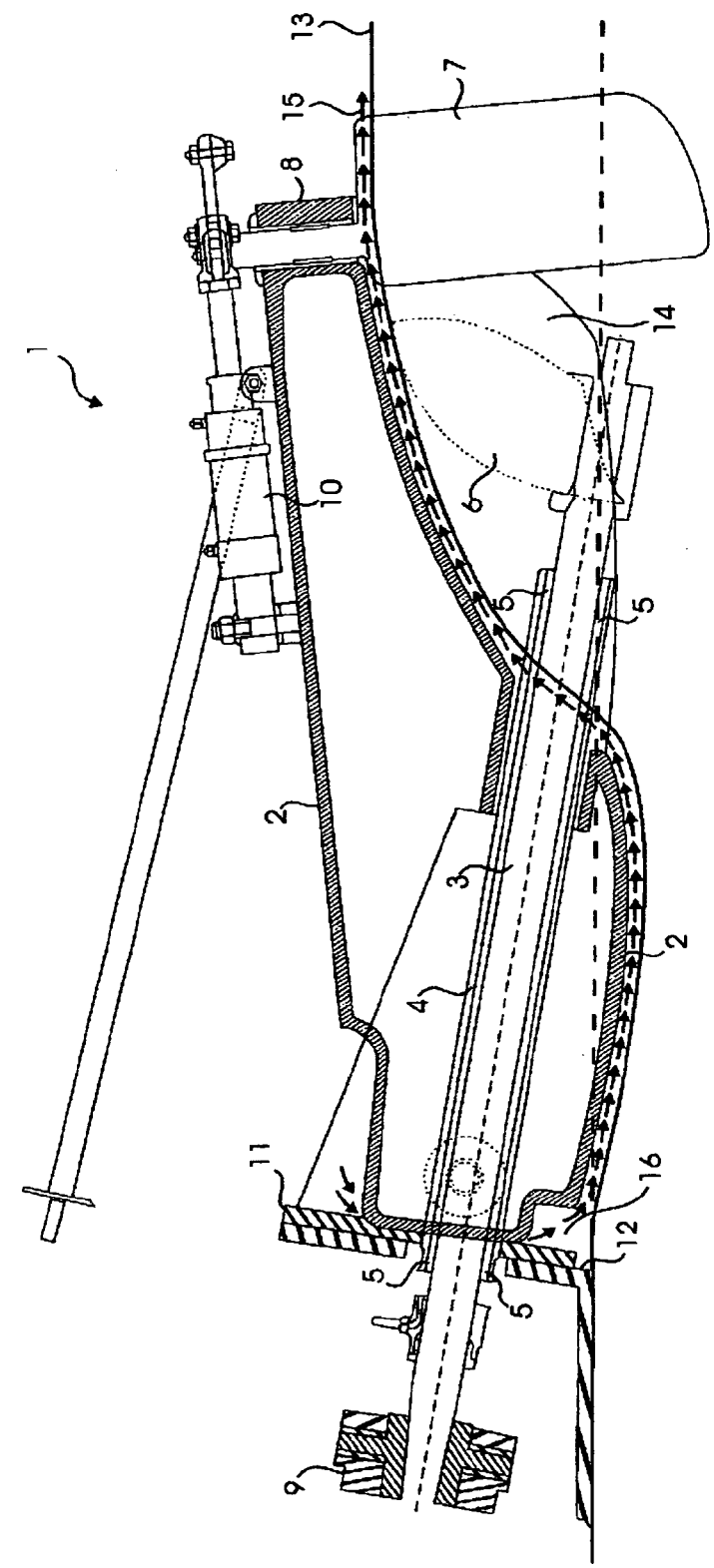
FIG. 1 depicts a cross sectional view of the stern unit.
Figure 2:
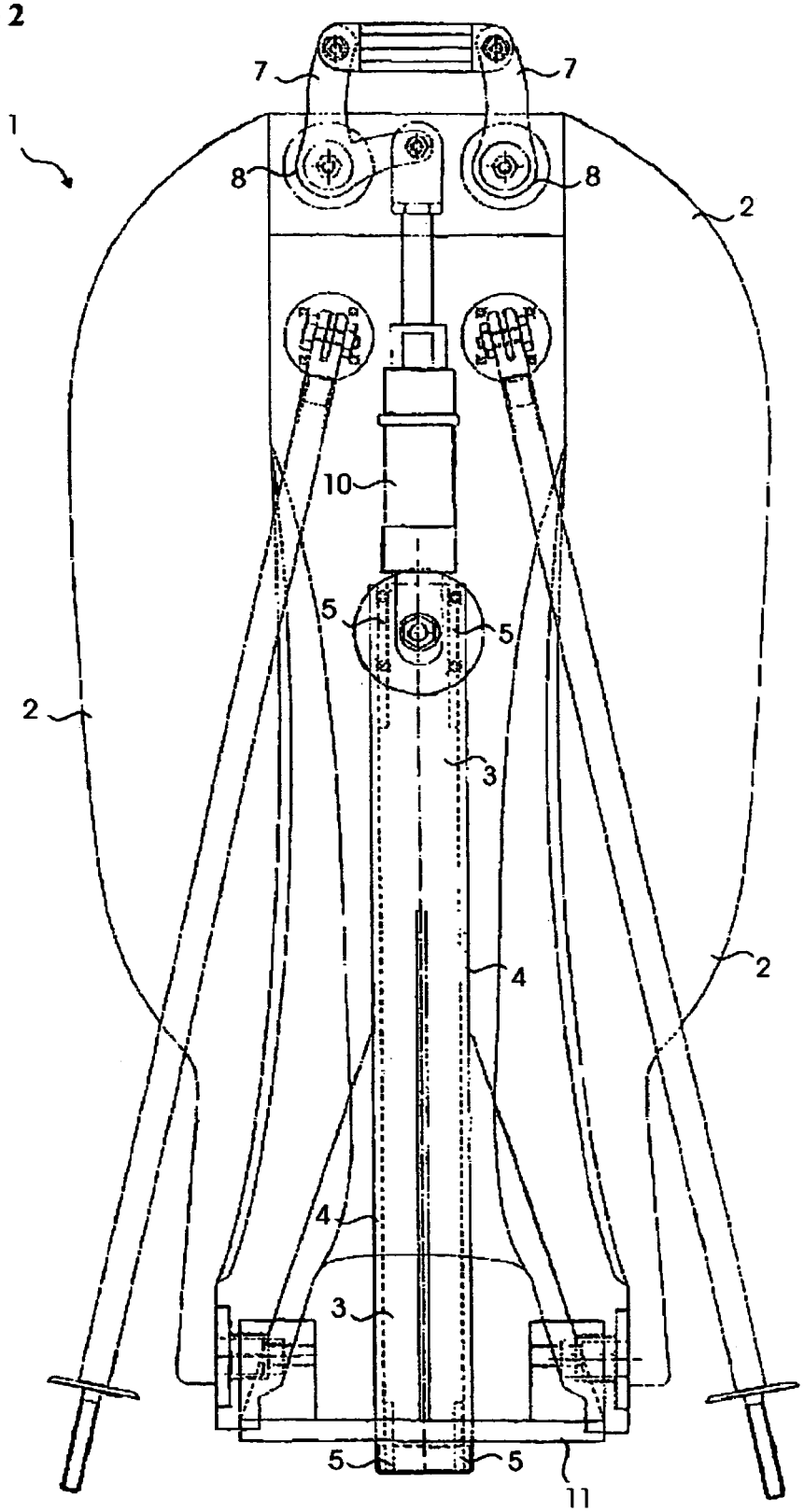
FIG. 2 depicts a plan view of the stern unit.
Figure 3:
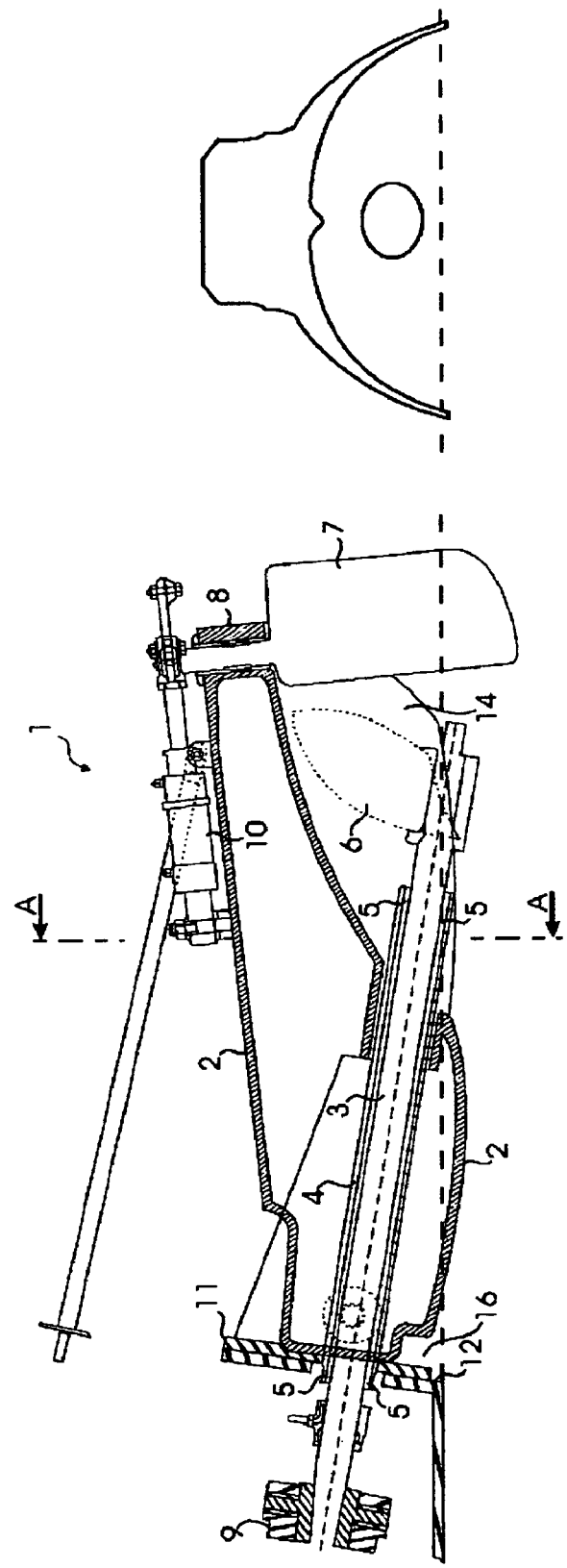
FIG. 3, depicts longitudinal and transverse cross-sectional views of the stern unit.

The components shown in the figures are individually enumerated as follows:
1. Stern unit
2. Casing
3. Shaft
4. Shaft housing
5. Water lubricated bearings
6. Propeller
7. Rudders
8. Rudder stand
9. Transmission element
10. Steering assembly comprising hydraulic cylinder and piston
11. Flange
12. Rear bottom edge of the hull
13. Water surface line
14. Inner surface of casing
15. Air film
16. Gap The stern unit (1) provides the movement and while having way, the guidance and direction of the marine craft.

The stern unit (1) comprises a casing (2), a shaft (3), a shaft housing (4), water lubricated bearings (5), propeller (6), one or more rudders (7), a rudder-stand (8) and a steering assembly comprising hydraulic cylinder and piston (10). The stern unit (1) contains a fish-back shaped casing (2) serving as a tunnel and a propeller (6) near the outlet of casing (2).

The propeller (6) is connected to the inboard engine mounted in the marine craft in a straight line, by means of the transmission mechanism using a shaft (3), borne in the shaft bearing (4) and water bearings (5) without using any spiders and balls. The rudders activated by means of a steering assembly comprising hydraulic cylinder and piston and is disposed in front of the propeller which enable the marine craft to be guided.

The casing (2) that protects the propeller and is used to guide the water, consists of two sections that are open at the bottom, namely; an inlet and an outlet section. The inlet section is a narrow section where the stein unit (1) is connected to the transom of the hull (12). The stern unit (1) is fixed to the rear wall of the hull (12) by means of a flange (11) over the inlet section; whereas the outlet section, being an extension of the inlet section, has a fish-back shaped curved structure that expands towards the end portion. The bottom surface of the casing (2) has a parabolic cross-sectional shape (FIG. 1). However the upper section of one arm of the parabole, which is the nearest to the rear of the marine craft (12) has an inclined structure and during the motion of the marine craft, the water stream passing below the marine craft first strikes this inclined surface which is at the bottom surface of the casing (2). Due to the difference of height between the lower line of the marine craft and the inclined surface provided on the lower surface of the casing (2) which is placed at a higher level, withdrawal of air from the water surface line towards the surface of the casing (2) is enabled.

In this case, water and air mix together at the peak point of the lower surface of the casing (2) which has a parabolic cross-sectional shape and by providing an air film, friction between the casing (2) and the water is thus minimized without causing any air ingestion by the water stream passing through the propeller. Furthermore, a steering assembly comprising hydraulic cylinder and piston (10) is supported at the upper side of the casing (2) to enable the rudder(s) (7) to move and the rudder stand (8) is provided at the down stream end of the casing (2). In this preferred embodiment, the inner surface of the casing (14), the air film (15), the gap (16), the trace line of the boat bottom and the direction of the flow are show in FIG. 1.

The torque and the trust obtained from the inboard engine and the transmission mechanism are linearly transmitted to the shaft (3) by using an elastic transmission element (9).

In this case, the force and movement obtained from the inboard engine and the transmission mechanism, are linearly transmitted to the propeller (6) mounted at the end of the shaft (3) without any energy loss. The shaft (3) is placed in the casing (2), between the water bearings (5) preferably made of rubber, that surround the shaft (3) and which are placed in the tube formed shaft housing (4) in the casing (2) so that preferably one is provided at the front and one at the back side.

Water taken in for cooling the engine is transmitted to the shaft housing (4) wherein the shaft (3) is placed between the water bearings (5), by means of a pump and a valve, in order to form a thin layer of water between the shaft (3) and the water bearings (5) and the shaft housing (4). Formation of such a layer of water, cools the shaft (3) and minimizes the friction between the shaft (3) and the water bearings (5).

Preferably two rudders (7) which are activated by means of a steering assembly comprising hydraulic cylinder and piston (10) placed above the casing (2), are located in front of the propeller (6).

The rudders (7) are placed in the rudder stands (8) located above the casing (2), in such a manner that a certain distance is kept between them. Using the axis of the rudders stands (8), the rudders (7) may be moved. By using two rudders (7), a channel is formed wherein the water stream created by the propeller (6) is oriented without blocking its flow. By means of the rudders (7) which are simultaneously oriented to the same direction by the steering assembly comprising hydraulic cylinder and piston (10), the direction of water stream while flowing from the channel is changed which also changes the direction of the boat.

In the stern unit (1) according to the present invention, the components used in other conventional stern units, such as lubrication, felts (including felt gaskets) against oil leakage, balls used in shaft bearings (3), spider balls used to direct the power and in association with these, the supplementary fastening elements such as the bellow, bolts and clamps, gear assemblies and joints, are not used.

In addition to the linear transmission of the engine power to the propeller (6) and water without any loss of energy, the number of operating components is minimized, thus reducing the potential of break-down and damage to a minimum level. Furthermore, intervals between successive maintenance are longer due to the fact that the number of components is less and no mechanical wearing is observed; and as no balls are used in the stern unit (1), it operates with less noise and without any vibrations, as compared to other stern units.

FIG. 1 shows a stem unit for a marine craft (1) comprising a shaft (3) which transmits the torque produced by the inboard engine linearly, a propeller (6) activated by and located at the front end of the shaft, at least one rudder (7) located in front of the propeller guiding the marine craft, which are activated by means of a steering assembly comprising hydraulic cylinder and piston (10) wherein the at least one rudder is maneuvered by the steering assembly. The stern unit is characterized with a casing (2) having a bottom surface with a parabolic cross-sectional profile and providing a housing to the shaft, the propeller, the at least one rudder, the casing being spaced with the stem such that a gap located above the trace line of the boat bottom is created wherein air is sucked above water surface line creating an air film which incliningly extends along the bottom surface from an inlet section to an outlet section of the casing, to reduce the frictional resistance between the flowing water and the bottom surface and enable additional thrust; wherein the hydraulic cylinder and the piston of the steering assembly are mounted on the casing.

The invention claimed is:

1. A stern unit for mounting to a stern end of a marine craft, the stern unit comprising:
   a shaft which transmits torque produced by an inboard engine linearly;
   a propeller activated by and located at a front end of said shaft;
   at least one rudder located in front of the propeller guiding the marine craft;
   a steering assembly comprising a hydraulic cylinder and a piston, wherein the at least one rudder is maneuvered by the steering assembly; and
   a casing having a bottom surface with a parabolic cross sectional profile and providing a housing to the shaft, the propeller, and the at least one rudder, the casing being spaced with the stern end so as to provide a gap between the casing and the stern end above a trace line of a marine craft bottom, a portion of the bottom surface sloping downwardly away from the stern end and extending below the trace line, wherein air is sucked at the gap above water surface line creating an air film which extends inside the casing along the bottom surface to an outlet of the casing to reduce the frictional resistance between the flowing water and the casing surface; and
   wherein the hydraulic cylinder and the piston of the steering assembly are mounted on the casing.

2. The stern unit of claim 1, wherein the at least one rudder is at least two rudders.

3. The stern unit of claim 1, wherein the casing diverges rearwardly toward the outlet section.

* * * * *